United States Patent [19]

Suh

[11] Patent Number: 5,690,822

[45] Date of Patent: Nov. 25, 1997

[54] WATER PURIFIER HAVING A STORAGE TANK AND AN EXCESS WATER DISCHARGE CONDUIT

[75] Inventor: Sang-Wook Suh, Songtan, Rep. of Korea

[73] Assignee: Samsung Electronics Co., Ltd., Suwon, Rep. of Korea

[21] Appl. No.: 558,982

[22] Filed: Nov. 16, 1995

[30] Foreign Application Priority Data

Nov. 14, 1994 [KR] Rep. of Korea ............... 94-30239 U

[51] Int. Cl.$^6$ ........................................... B01D 35/00
[52] U.S. Cl. .................................. 210/248; 210/262
[58] Field of Search ............................ 210/248, 540, 210/259, 260, 261, 262

[56] References Cited

U.S. PATENT DOCUMENTS

| | | | |
|---|---|---|---|
| 1,667,439 | 4/1928 | Sauer | 210/262 |
| 1,800,517 | 4/1931 | Foster | 210/248 |
| 2,444,682 | 7/1948 | Smith | 210/248 |
| 3,526,320 | 9/1970 | Kryzer | 210/262 |
| 4,160,727 | 7/1979 | Harris, Jr. | 210/259 |
| 4,608,157 | 8/1986 | Graves | 210/248 |
| 4,859,320 | 8/1989 | Beall, Jr. | 210/248 |
| 4,946,600 | 8/1990 | Shin | 210/758 |
| 5,049,270 | 9/1991 | Carrano et al. | 210/248 |

*Primary Examiner*—Cynthia L. Nessler
*Attorney, Agent, or Firm*—Burns, Doane, Swecker & Mathis, L.L.P.

[57] ABSTRACT

A water purifier includes a filter for purifying water, and a tank for storing purified water. The tank includes a discharge hole for discharging excess water disposed above a certain level in the tank. A conduit structure communicates with the discharge hole for conducting the discharged excess water. The conduit structure includes vertical interruptions for preventing a backflowing of the discharged water back into the tank.

1 Claim, 3 Drawing Sheets

WATER PURIFIER HAVING A STORAGE TANK AND AN EXCESS WATER DISCHARGE CONDUIT

BACKGROUND OF THE INVENTION

1. Field of the Invention

The present invention relates to a water purifier for removing harmful materials contained in potable water to thereby enable sanitary dispensing of drinking water, and more particularly to an excess water discharge structure for discharging excess water from a storage tank.

2. Description of the Prior Art

Generally, a water purifier for removing pollutant materials included in the potable water (hereinafter referred to as water) is classified as various kinds according to the purifying method, but a reverse osmotic water purifier has been widely used, which serves to apply pressure to the water to thereby cause water purifying to be performed by an artificial osmotic membrane, so that heavy metals, bacteria, cancer-causing materials and the like can be removed to store only purified water and dissolved oxygen for dispensing.

Referring to FIG. 1, a body 1 of a conventional water purifier is provided at an upper side thereof with a releasable purified water tank 4 for dispensing purified water by opening and closing a dispensing outlet 3 according to manipulation of a lever 2. The body 1 is provided at a rear side thereof with filtering means 8 for eliminating various pollutant materials contained in the water supplied from a water supply pipe 6 connected to a faucet 5 to thereby store the same in the purified water tank 4 through a purified water pipe 7a. The purified water tank 4 is provided at a rear surface thereof with an overflow pipe 9 for discharging excess purified water when the purified water arrives at a predetermined level. The filtering means 8 is connected at a lower side thereof to a discharge pipe 7b for discharging concentrated (unfiltered) water which has not yet been purified.

Accordingly, the water supplied through the water supply pipe 6 connected to the faucet 5 is separated from pollutant materials by the filtering means 8 and is stored at an appropriate level in the purified water tank 4 through the purified water pipe 7a, and the concentrated water which has not passed through the filtering means 8 is discharged through the discharge pipe 7b.

At this time, when the purified water quantity in the purified water tank 4 arrives at a point above the appropriate level due to erroneous operation by a control means intended to maintain a predetermined water level at all, times, the excess purified water is drained out into a sink and the like through the overflow pipe 9 to thereby make it possible to keep the predetermined level in the purified water tank 4 at all times.

However, there is a problem in the conventional prior art thus constructed in that, because the overflow pipe forms a continuous (uninterrupted) connection between the sink and the tank, the purified water polluted by germs and the like at the sink flows backward through the overflow pipe into the purified water tank, thereby contaminating the purified water and decreasing purifying capability markedly.

SUMMARY OF THE INVENTION

Accordingly, the present invention is disclosed to solve the aforementioned problem and it is an object of the present invention to provide an excess discharge apparatus of a water purifier by which excess purified water is discharged and at the same time, is inhibited from flowing backwards into the tank.

The water purifier according to the present invention comprises a purified water tank where purified water separated from pollutant materials by filtering means is stored, and a discharge structure for discharging excess water from the purified water tank and, at the same time, for preventing pollutant water discharged to the outside from backflowing into the purified water tank.

BRIEF DESCRIPTION OF THE DRAWINGS

Other objects and aspects of the invention will become apparent from the following description of an embodiment with reference to the accompanying drawings in which.

DETAILED DESCRIPTION OF A PREFERRED EMBODIMENT OF THE INVENTION

Figure 1:
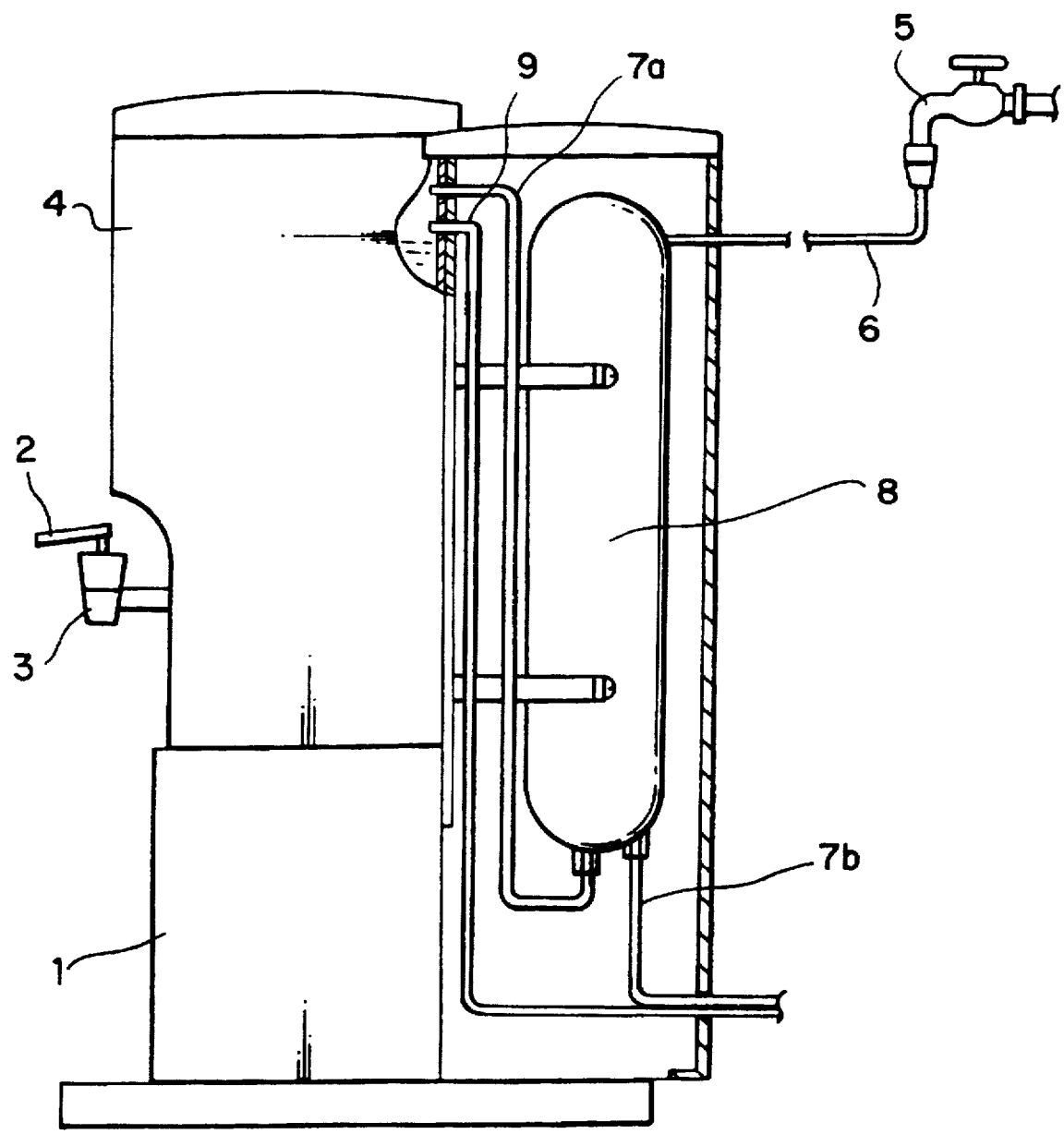
FIG. 1 is a side view, partially cutaway, of a conventional water purifier.
Figure 2:
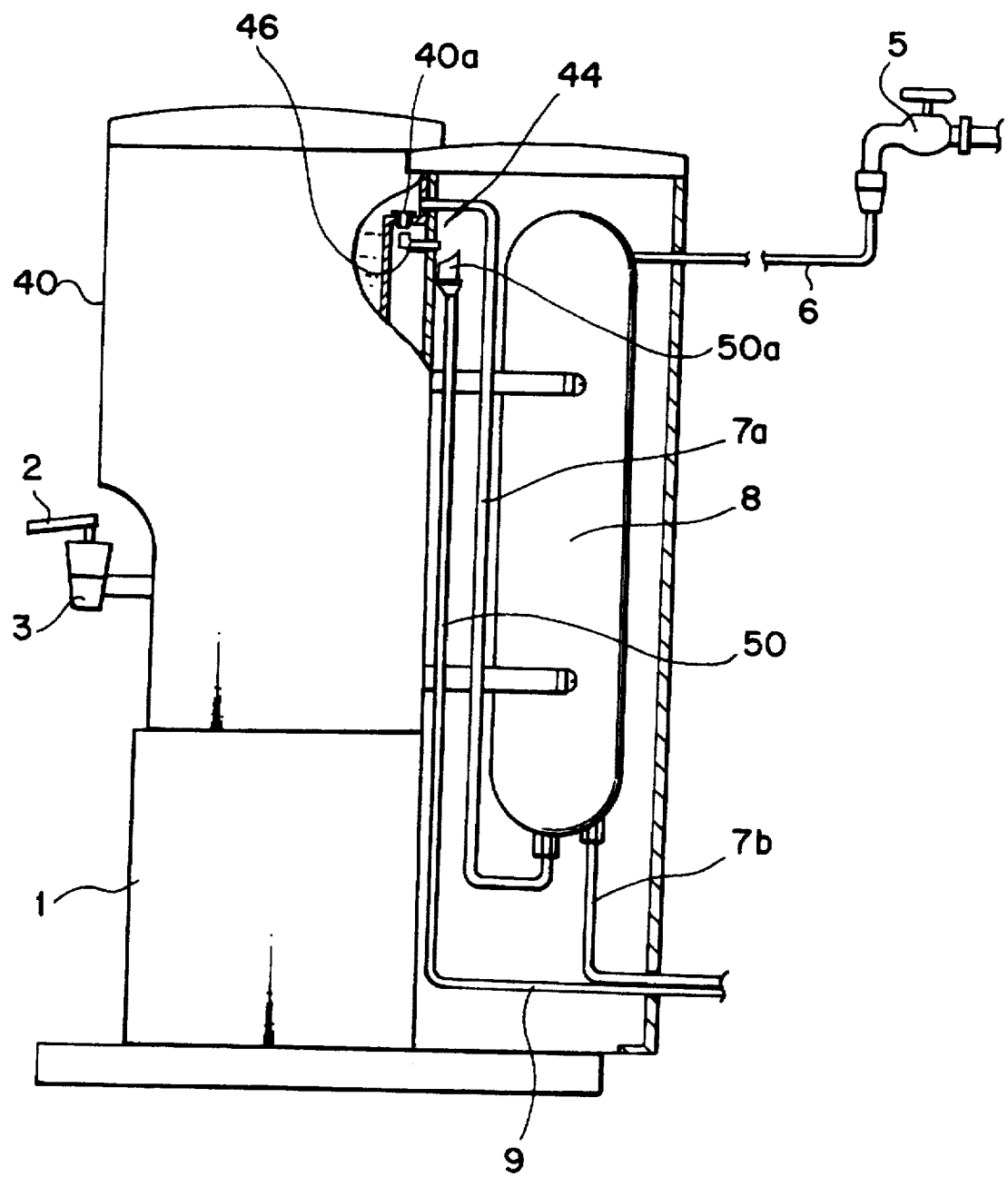
FIG. 2 is a side view, partially cutaway, of a water purifier according to the present invention.
Figure 4:
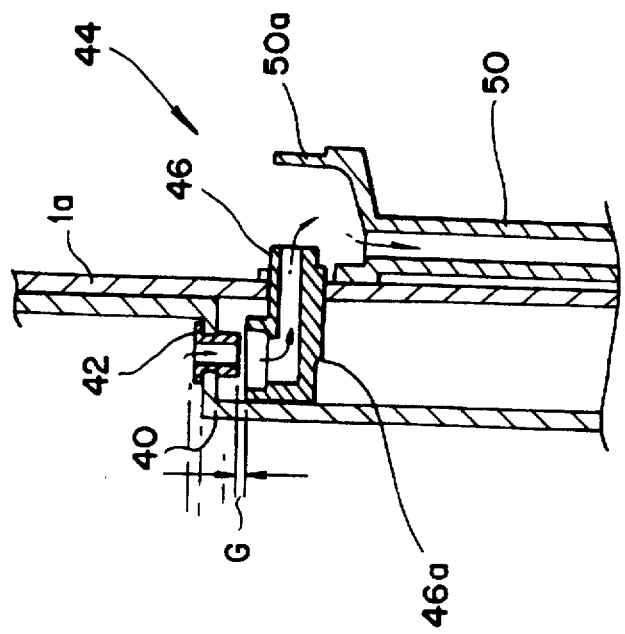
FIG. 4 is a sectional view for illustrating assembled principal parts of the present invention.
Figure 3:
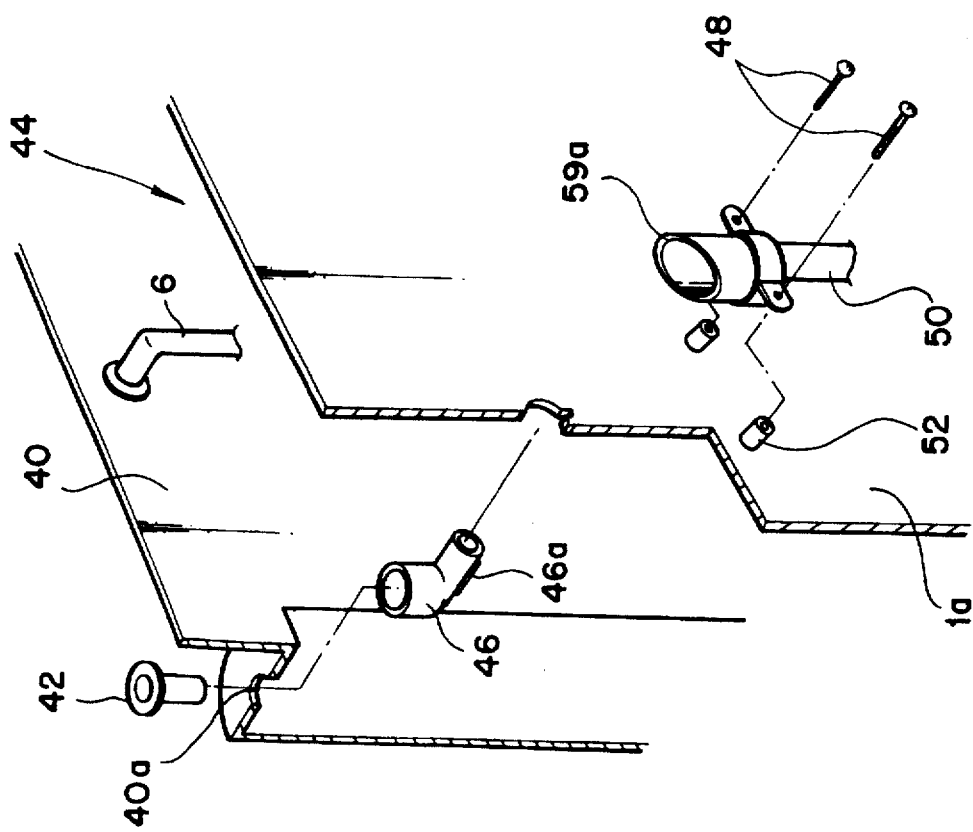
FIG. 3 is an exploded perspective view for illustrating an excess water discharge apparatus of the water purifier according to the present invention.

Throughout the drawings, like reference numerals and symbols are used for designation of like or equivalent parts or portions for simplicity of illustration and explanation, a detailed description of which will be omitted.

Reference numeral 40 in the drawings represents a purified water tank formed with an overflow hole 40a at a predetermined height for discharging excess purified water disposed above the predetermined height, and the overflow hole 40a tightly receives a packing member 42.

Additionally, the overflow hole 40a communicates with excess water discharge means 44 for preventing the discharged polluted water and the like from flowing back into the purified water tank 40.

The excess water discharge means 44 includes an intermediate inflow member 46 fixed in a vertical rear plate 1a formed at a rear surface of the body 1 to thereby accommodate the overflowed water dropping from the overflow hole 40a, and a water collecting member 50 fixedly fastened to the rear surface plate 1a by a fastening bolt 48 in order to accommodate the overflowed water dropping from the intermediate inflow member 46.

Furthermore, the intermediate inflow member 46 is formed on an external side thereof with a rotation prevention protruder 46a in order to prevent the same from being rotated while disposed in the rear plate 1a.

The water collection member 50 is formed at an upper end thereof with a water collecting unit 50a in order to facilitate inflow of the overflowed water dropping from the intermediate infuse member 46, and is connected at a lower end thereof to the overflow pipe 9 for discharging the overflowed water outside of the body 1.

It should be noted that the intermediate infuse member 46 is preferred to be spaced at an interval from the packing member 42, and the water collecting member 50 is also preferred to be spaced at an interval from the intermediate infuse member 46. By this, the pollutant water and the like can be prevented from flowing backward into the purified water tank 40, to thereby prevent pollution of the purified water.

Numerals 52 represent bosses protrudingly formed at the rear surface plate 1a in order to fasten the water collecting member 50 to the plate 1a.

Now, the operation of the overflow prevention apparatus of a water purifier according to the present invention will be described.

First of all, the water supplied from the faucet 5 through The water supply pipe 6 becomes purified by the filtering means 8, and the purified water is stored in the purified water tank 40 through a purified water pipe 7a and at the same time, concentrated water containing pollutant materials which has not passed through the filtering means 8 is discharged outside via the discharge pipe 7b.

When an appropriate quantity of purified water is stored in the purified water tank 40, supply of the purified water is stopped by operation of control means (not shown) to thereby maintain an adequate amount of purified water in the purified water tank 40 at all times. The purified water can be easily dispersed through a dispersing outlet 3 by manipulation of a lever 2.

At this time, when excess purified wafer is disposed above the adequate level due to erroneous operation of the control means and the like for controlling the stored quantity of the purified water in the tank 40, the excess purified water above the adequate level is discharged outside of the body 1 through the excess water discharge means 44 and the overflow pipe 9.

In other words, when the purified water in the tank 40 is above the overflow hole 40a, the excess water is discharged through the packing member 42, and the overflowed water discharged through the packing member 42 drops into an inlet of the intermediate infuse member 46 to thereafter be discharged through the water collecting member 50 and the overflow pipe 9, so that the stored quantity of the purified water in the tank 40 is always maintained at a predetermined level, thereby preventing overflow across an upper edge of the purified water tank 40.

At this time, because the intermediate infuse member 46 is formed with the rotation prevention protruder 46a, member 46 cannot rotate out of its pre-set position, so the overflowed water dripping from the packing member 42 is prevented from being infused into the body 1 and the like.

Furthermore, the pollutant water contaminated by germs and the like cannot reach the tank 40 by flowing backwards through the overflow pipe 9 because there are intervals or interruptions between the water collecting member 50 and the intermediate infuse member 46, and between the intermediate infuse member 46 and the packing member 42, to thereby prevent contamination of the purified water in the purified water tank 40.

As is apparent from the foregoing, the excess water discharge apparatus according to the present invention can discharge overflowed water when the purified water quantity supplied into the purified water tank rises above a predetermined adequate level, and at the same time, can prevent backward flow of pollutant water back into the tank, to thereby enable obtainment of hygienic and clean purified water.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A water purifier comprising:

a filter for purifying water; a storage tank connected to the filter for storing purified water; and an excess water discharge structure for discharging from the tank excess purified water disposed above a pre-set level in the tank; wherein the excess water discharge structure forms a water passage mounted stationarily with respect to the tank; the water passage including an overflow hole disposed at said pre-set level and communicating directly with an upper water level of water stored in the tank so that the overflow hole receives a flow of the stored water from the upper water level when the upper water level exceeds the pre-set level; the water passage containing at least one interruption in the form of a vertical gap disposed in the passage; the vertical gap situated at an elevation below the upper water level of water stored in the tank and preventing a backflow of the discharged excess purified water back into the tank; the water passage further comprising an inflow member having an inlet disposed vertically beneath the overflow hole to receive excess water dropping therefrom; a vertical space disposed between the overflow hole and the inlet of the inflow member defining the vertical gap; wherein the inflow member includes an outlet spaced horizontally from the inlet; the water passage further comprising a water pipe spaced vertically beneath the outlet of the inflow member to define a second interruption in the form of a second vertical gap, wherein the water purifier further includes a body having a horizontal wall and an upright wall, the storage tank being seated on the horizontal wall and a side of the storage tank resting against the upright wall, and wherein a portion of the inflow member extends through the upright wall and includes a projection disposed therein for preventing rotation of the inflow member relative to the upright wall.

* * * * *